Nov. 13, 1956 W. E. LANHAM 2,770,201
DOUGH HANDLING AND WORKING
Filed Sept. 5, 1952
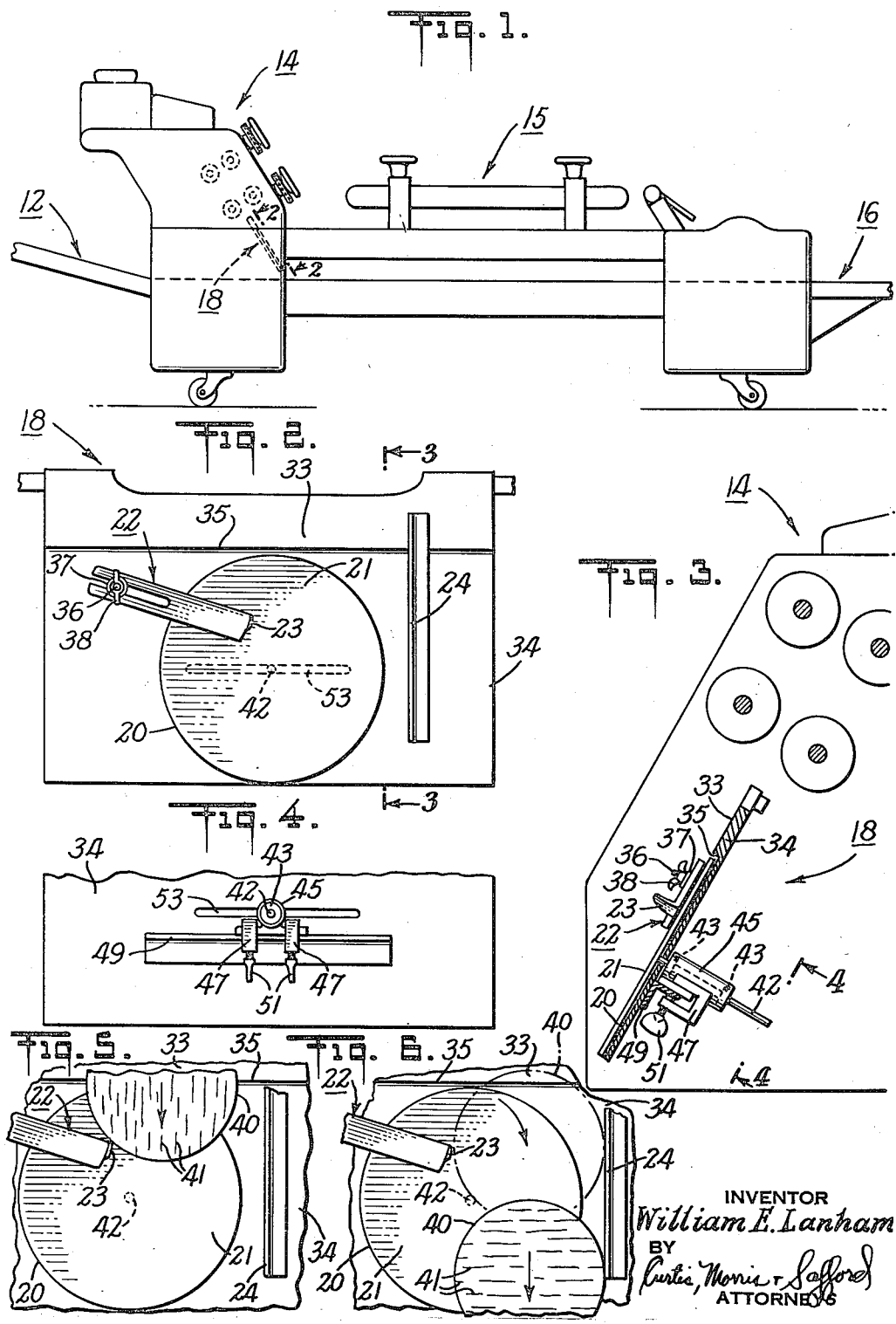
INVENTOR
William E. Lanham
BY
Curtis, Morris & Safford
ATTORNEYS

United States Patent Office 2,770,201
Patented Nov. 13, 1956

2,770,201
DOUGH HANDLING AND WORKING

William E. Lanham, Atlanta, Ga.

Application September 5, 1952, Serial No. 307,957

4 Claims. (Cl. 107—12)

This invention relates to automatic bread making operations, and more particularly the invention relates to molding equipment and to an arrangement for insuring the proper working and handling of dough pieces.

It is an object of the present invention to provide an improved mode of operation whereby improved quality bread is produced automatically. It is a further object to provide equipment for automatically turning dough pieces or the like during the working of kneading thereof. It is a further object to provide apparatus for automatically imparting turning movement to a dough piece when in disc form. It is a further object to provide for the above in an improved manner with apparatus which is inexpensive to manufacture and maintain, dependable in use, simple in construction, and which is adaptable to many varying conditions of operation and installation. These and other objects will be in part apparent and in part pointed out below.

In the drawings:

Figure 1 is a side elevation of one embodiment of the invention;

Figure 2 is a sectional view on line 2—2 of Figure 1;

Figure 3 is a sectional view on the line 3—3 of Figure 2;

Figure 4 is a sectional view on line 4—4 of Figure 3;

Figures 5 and 6 are views similar to the central portion of Figure 2 and demonstrating the mode of operation.

In making bread automatically, the present invention contemplates that the dough pieces be turned so as to insure the proper graining, i. e. so as to avoid excessive gas bubbles or voids in the product. The dough is first mixed and passed to a divider where it is cut into square dough pieces. The dough pieces are separated and passed to a rounder and then to a proofer where they remain for approximately thirty minutes. The dough pieces rise in the proofer to form dough balls from which they pass to a sheeter having a roller which flattens them into disc-like pieces. The proofer produces gas cells and when the dough balls pass through the rollers these gas cells are flattened and elongated in the line of movement through the rollers in the mixing operation. The disc or sheets are then rolled up from the leading edge into a roll and each of these rolls is then deposited in a pan or mold in which it is baked into a loaf of bread.

The present invention provides in combination with the remainder of the equipment and with the process set forth, equipment and a method for turning each sheet or disc-like piece about its central disc axis. This turning movement is through an angle of approximately ninety degrees so that the elongated bubbles of gas cells then extend transversely of the direction of further movement. Thus the further working and rolling of the sheet into a roll tends to work the dough across the grain of the prior working in the sheeter. In this way the air cells are flattened and worked transversely of their lengths, and this produces bread which has superior texture and which is more homogeneous with no gas cells or "voids" of excessive size.

This process of turning or rotating each of the dough pieces about its disc axis after the sheeting and before the rolling operation, may be identified in the baking industry as "cross-graining," and this term will be so used herein.

Referring now to Figure 1, there is shown a molder and panner having a feed conveyor 12, a sheeter 14, a rolling unit 15, and a take-off conveyor 16. Positioned just below the sheeter in the direction of movement of the dough (see also Figures 2 and 3) is a downwardly inclining cross-graining assembly 18. This assembly comprises a rectangular base plate 34, a disc 20, a hook 22, an angle bracket guide 24, and adjustable mounting means for the hook and also for the disc. The hook is mounted on a pivot screw or bolt 36 which is rigidly mounted in plate 34, and a wing nut 38, which is provided with a washer 37. Hook 22 has a slot which extends in from its left hand end and through which the pivot screw or bolt 36 extends.

As shown best in Figure 3, base plate 34 is cut away below a ledge 35, below disc 20, which is positioned so that the top surface 21 of the disc is flush with the top surface 33 of the base plate, so that the base plate and the disc present a continuous supporting and guide surface down which the dough pieces are directed from the sheeter. Disc 20 has rigidly mounted on its bottom surface a pivot spindle 42 (Figure 3) which projects through a pair of ball bearing units 43 in a bracket 45 which in turn is securely held by a pair of C-clamps 47 (see Figure 4) to an angle bar 49 welded to the bottom surface of base plate 34. Each of the C-clamps 47 has a thumb screw 51 which is tightened to provide the clamping. Spindle 42 projects through a slot 53 in base plate 34 and the disc may be moved longitudinally of this slot by loosening the thumb screw 51.

Referring now again to Figure 2, hook 22 has an end hook or toe portion 23 which is shown positioned to the left and above the center of disc 20. This end hook thus presents a dough piece engaging ledge against which the dough pieces move as they pass downwardly from the sheeter.

Referring now to Figure 5, a dough piece 40 is shown at the instant that it engages the hook portion 23 and at this time it has moved partly from the surface 33 and is partially supported by the top surface 21 of the disc. At this time the dough piece is sliding with a somewhat vertical falling movement in the direction of the arrow. However, the engagement of the hook portion 23 by the dough piece causes the dough piece to tend to swing to the right, that is, clock-wise about the hook portion and it moves to the broken line position of Figure 6.

In the meantime the dough piece has moved substantially off of the supporting surface 33, and it is supported primarily by the disc surface 21. The right hand edge of the dough piece, however, engages the vertical guide 24 so that the dough piece remains on the disc.

The friction between the dough piece and the disc tends to impart a rotary movement to the disc with the result that the disc turns and the dough piece is therefore turned through an arc. The dough then moves on downwardly and passes from the disc.

In Figures 5 and 6 the elongated gas bubbles have been represented schematically by the broken lines 41, and in Figure 5 it is seen that they extend vertically, whereas at the bottom of Figure 6 they extend horizontally. In the broken line position of Figure 6 they are in an intermediate position. Hence the total turning of the dough piece 40 is through an arc of ninety degrees so that the dough piece 40 moves from the disc with its bubbles elongated transversely of its direction of movement. Therefore, when the dough piece is rolled from its leading edge, the working which accompanies the rolling tends to flatten the gas bubbles. As indicated above, this produces an improved bread texture and insures against voids in the final product.

In operation the disc 20 rotates at a fairly constant speed as a result of the rather constant action of the successive dough pieces. Disc 20 has sufficient momentum and it is freely pivoted so that it tends to maintain a constant rate of movement. Under some circumstances, an additional mechanical turning effect may be provided for the disc, such, for example, as a low power motor drive. With the illustrative embodiment, however, no such drive is necessary, and in fact, superior results have been obtained without any such drive.

The turning movement which is imparted to each dough piece may be regulated by adjusting the position of the disc and the hook 22. Furthermore, the mechanism may be readily adjusted for dough pieces of other sizes and weights by merely changing the position of the disc and the hook. The disc and the hook may be readily removed for replacement or cleaning and repair. The construction is sturdy, and it is simple to manufacture and install. It is thus seen that an apparatus and method are provided for carrying out the objects above set forth.

The foregoing is illustrative of preferred embodiments of my invention and it is to be understood that various alternatives and modifications may be adopted by those skilled in the art, and it is intended that such alternatives and modifications be encompassed within the scope of the claims appended hereto.

I claim:

1. In an automatic bread making machine of the type wherein the dough is mixed and cut into pieces and sheeted and is then rolled into cylindrical loaf like shapes for baking, an assembly disposed along the path of travel of the dough sheet between the sheeter and the rolling operation comprising, a base plate positioned along the path of the dough and downwardly inclined whereby the dough tends to slide therealong, a rotatable disc adjustably mounted thereon and having its upper surface in alignment with the upper surface of said base plate, said disc being freely pivoted upon an axis out of alignment with the center of dough pieces passing along the base plate, a movable hook adjustably mounted on said plate adjacent said disc and having a dough engaging portion positioned to intercept the edge of dough pieces passing downwardly onto the edge of said disk, with the line of engagement being on the same side of the center of the dough piece as the axis of said disc, said disc and hook being movable relative to each other and to said plate, and a fixed guide mounted on said plate and adapted to ensure that at least a portion of the dough piece is engaged by said disc.

2. In an automatic bread making device of the type wherein dough pieces are transported along a path, a mechanism disposed adjacent said path, which comprises a base plate mounted along said path with a downward incline, a rotatable disc adjustably mounted thereon and having its upper surface in alignment with the upper surface of said base plate, said disc being freely pivoted upon an axis out of alignment with the center of dough pieces passing along the base plate, and a hook movably mounted adjacent said disc so as to project thereover and having a dough engaging portion positioned to intercept the edge of dough pieces passing downwardly onto the edge of said disc, with the line of engagement being on the same side of the center of the dough piece as the axis of said disc.

3. A device as described in claim 2 wherein said hook is mounted ahead of and to one side of said disc in the direction of travel of the dough whereby the dough piece strikes said hook when moving onto said disc and imparts rotary motion to said disc and rotates said dough piece about its axis and discharges it at a point approximately opposite its point of entry upon said disc.

4. In the art of dough handling, wherein pieces of dough are transported along a path as the various working steps are performed thereon, the method of rotating each of said dough pieces about its central axis which comprises, passing the dough piece through a downwardly sloping zone, engaging and supporting the dough piece from beneath with a turnable surface within said zone as said dough piece is passed therethrough, and engaging the periphery of the said dough piece with a stationary pivot to impart a rotary moment to said turnable surface to thereby rotate said dough piece positioned thereon.

References Cited in the file of this patent

UNITED STATES PATENTS

| 795,081 | Wank | July 18, 1905 |
| 883,370 | Wood | Mar. 31, 1908 |
| 1,551,131 | Bohnet | Aug. 25, 1925 |
| 2,479,864 | Rhodes | Aug. 23, 1949 |
| 2,534,734 | Rhodes | Dec. 19, 1950 |

FOREIGN PATENTS

| 501,285 | France | Jan. 21, 1920 |
| 21,480 | France | July 6, 1920 |
| | (Addition to No. 501,285) | |